US011889365B2

(12) United States Patent
Baba et al.

(10) Patent No.: US 11,889,365 B2
(45) Date of Patent: Jan. 30, 2024

(54) BASE STATION DEVICE, PROGRAM, FLYING BODY, AND CONTROL METHOD

(71) Applicant: HAPSMobile Inc., Tokyo (JP)

(72) Inventors: Akihiro Baba, Tokyo (JP); Mizuki Funakoshi, Tokyo (JP); Yonghong Tan, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/339,246

(22) Filed: Jun. 22, 2023

(65) Prior Publication Data

US 2023/0337078 A1  Oct. 19, 2023

Related U.S. Application Data

(63) Continuation of application No. PCT/JP2021/046357, filed on Dec. 15, 2021.

(30) Foreign Application Priority Data

Dec. 24, 2020  (JP) ................... 2020-215885

(51) Int. Cl.
*H04W 36/00* (2009.01)

(52) U.S. Cl.
CPC ........... *H04W 36/008355* (2023.05); *H04W 36/0085* (2018.08)

(58) Field of Classification Search
CPC ......... H04W 36/0005; H04W 36/0083; H04W 36/00835; H04W 36/008355; H04W 36/00837; H04W 36/0085; H04W 36/0088; H04W 36/0094
See application file for complete search history.

(56) References Cited

U.S. PATENT DOCUMENTS

| 2016/0081021 A1* | 3/2016 | Abdel-Samad | ....... H04W 76/50 370/311 |
| 2019/0037417 A1* | 1/2019 | Lei | ...................... H04W 72/542 |
| 2020/0383029 A1 | 12/2020 | Takeda | |

FOREIGN PATENT DOCUMENTS

| JP | 2002211496 A | 7/2002 |
| JP | 2018148542 A | 9/2018 |
| JP | 2018191089 A | 11/2018 |

OTHER PUBLICATIONS (ISA/237) Written Opinion of the International Search Authority for International Patent Application No. PCT/JP2021/046357, mailed by the Japan Patent Office dated Mar. 15, 2022.
(Continued)

*Primary Examiner* — Matthew W Genack

(57) ABSTRACT

Provided is a base station device including: a scheme selection unit that selects a scheme of HO from a first scheme not using an NRT and a second scheme using the NRT; and an HO control unit that, when the first scheme is selected, causes the UE to measure system information of an HO candidate cell, receives an ECGI, and controls HO by using cell information of the HO candidate cell received from a core network by using the ECGI, and, when the second scheme is selected and the PCI of the HO candidate cell is included in the NRT, controls the HO by using cell information corresponding to the PCI, and when the PCI is not included, causes the UE to measure the system information of the HO candidate cell, receives the ECGI, controls the HO by using the cell information of the HO candidate cell.

20 Claims, 7 Drawing Sheets

(56) References Cited

OTHER PUBLICATIONS

Samsung, Cell Reselection, System Information, Paging-Enhancements, and Power-Efficient Neighbor Cell Search for an NTN[online], 3GPP TSG RAN WG2 #115-e R2-2107282, Aug. 5, 2021.

Samsung, Remaining Issues on Handover and Neighbor Search for an NTN[online], 3GPP TSG RAN WG2 #115-e R2-2107283, Aug. 5, 2021.

* cited by examiner

BASE STATION DEVICE, PROGRAM, FLYING BODY, AND CONTROL METHOD

The contents of the following patent application(s) are incorporated herein by reference:
NO. 2020-215885 filed in JP on Dec. 24, 2020
NO. PCT/JP2021/046357 filed in WO on Dec. 15, 2021

BACKGROUND

1. Technical Field

The present invention relates to a base station device, a program, a flight vehicle, and a control method.

2. Related Art

Known is a flight vehicle that includes an antenna and flies in a stratosphere, so as to provide a stratosphere platform (for example, see Patent Document 1).

CITATION LIST

Patent Document

Patent Document 1: Japanese Patent Application Publication No. 2002-211496

DESCRIPTION OF EXEMPLARY EMBODIMENTS

When the number of neighboring cells adjacent to a cell generated by a base station device is large, there is a possibility that a neighbor relation table (may be referred to as an NRT) used for handover (may be referred to as HO) is depleted. In particular, when the base station device is mounted on a high altitude platform station (HAPS) which covers a vast range with one cell, the possibility that the NRT is depleted is further increased. In addition, when the base station device provides services to a plurality of business operators, the possibility that the NRT is depleted is further increased. When the NRT is depleted, handover to a cell having no neighboring cell information may not be possible. A base station device 300 according to the present embodiment provides a mechanism for reducing the possibility of depletion of the NRT.

Hereinafter, the present invention will be described through embodiments of the present invention, but the following embodiments do not limit the present invention according to claims. In addition, not all combinations of features described in the embodiment are essential to the solution of the invention.

Figure 1:
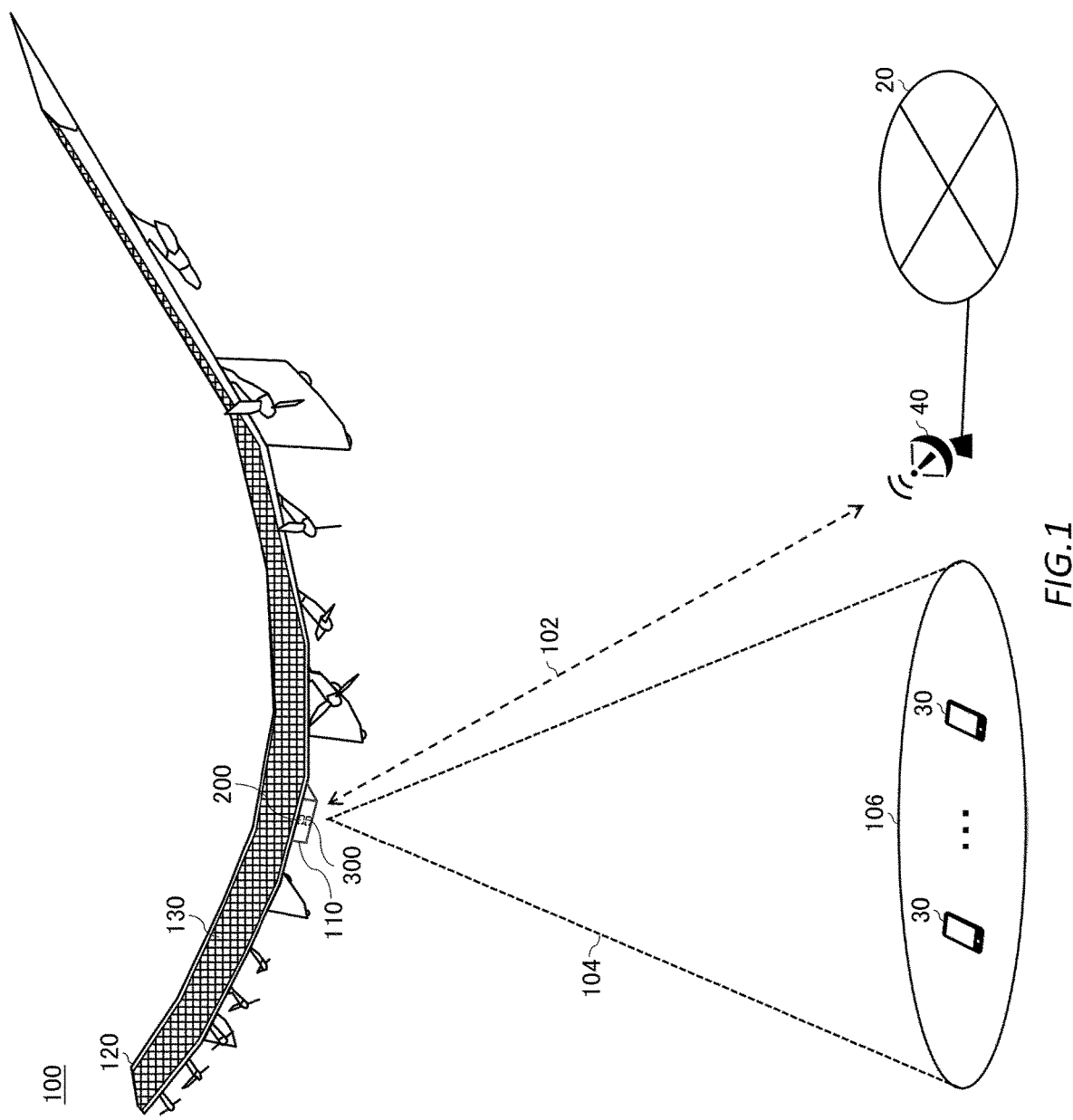
FIG. 1 schematically illustrates an example of a HAPS 100.

FIG. 1 schematically illustrates an example of a HAPS 100. The HAPS 100 may be an example of a flight vehicle. The HAPS 100 may function as a stratosphere platform. For example, the HAPS 100 forms a feeder link 102 with a gateway 40 on the ground while flying in a stratosphere, and forms a cell 106 by irradiating the ground with a beam 104.

The HAPS 100 includes a main body portion 110, a wing portion 120, and a solar cell panel 130. The power generated by the solar cell panel 130 is accumulated in one or more batteries arranged in at least any one of the main body portion 110 or the wing portion 120. The power accumulated in the battery is used by each configuration included in the HAPS 100.

A flight control device 200 and a base station device 300 are arranged in the main body portion 110. The flight control device 200 controls the flight of the HAPS 100. The base station device 300 controls the communication of the HAPS 100.

The flight control device 200 controls the flight of the HAPS 100, for example, by controlling the rotation of a propeller, the angle of a flap or an elevator, or the like. The flight control device 200 may manage various sensors included in the HAPS 100. Examples of the sensor include a positioning sensor such as a global positioning system (GPS) sensor, a gyro sensor, and an acceleration sensor. The flight control device 200 may manage the position, attitude, moving direction, moving speed, and the like of the HAPS 100 according to the outputs of various sensors.

The base station device 300 may form the feeder link 102 with the gateway 40 by using a feeder link (FL) antenna. The base station device 300 may access a core network 20 via the gateway 40.

The base station device 300 may form a cell 106 by irradiating the ground with the beam 104 by using a service link (SL) antenna. The cell 106 may be configured by one cell. In addition, the cell 106 may be a multi-cell. The base station device 300 may establish a service link with a user terminal (may be referred to as user equipment (UE)) 30 in the cell 106.

The base station device 300 relays communication between the core network 20 and the user terminal 30, for example, via the feeder link 102 and the service link. The base station device 300 may provide a wireless communication service to the user terminal 30 by relaying communication between the user terminal 30 and the core network 20.

The HAPS 100 may hover in the sky above a target area to cover the target area on the ground by the cell 106. For example, while the HAPS 100 flies in a circular orbit in the sky above the target area, the HAPS 100 maintains the feeder link 102 with the gateway 40 by adjusting a pointing direction of the FL antenna, and maintains covering the target area by the cell 106 by adjusting a pointing direction of the SL antenna.

The core network 20 may be managed by a communication operator. The core network 20 may be compliant with a long term evolution (LTE) communication scheme. That is, the core network 20 may be an evolved packet core (EPC). The core network 20 may be compliant with a 5th Generation (5G) communication scheme. That is, the core network 20 may be a 5th generation core network (5GC). The core network 20 may be compliant with a 3rd generation (3G) communication scheme, or be compliant with a communication scheme subsequent to a 6th generation (6G) communication scheme.

For example, when the core network 20 is compliant with the LTE communication scheme, the core network 20 includes a home subscriber server (HSS), a mobility management entity (MME), a serving gateway (SGW), a packet data network gateway (PGW), a policy and charging rules function (PCRF), and the like. The base station device 300 may function as an eNodeB (eNB).

For example, when the core network 20 is compliant with the 5G communication scheme, the core network 20 includes a unified data management (UDM), an access and mobility management function (AMF), a session management function (SMF), a policy control function (PCF), an authentication server function (AUSF), a network slice selection function (NSSF), and the like. The base station device 300 may function as a gNodeB (gNB).

Figure 2:
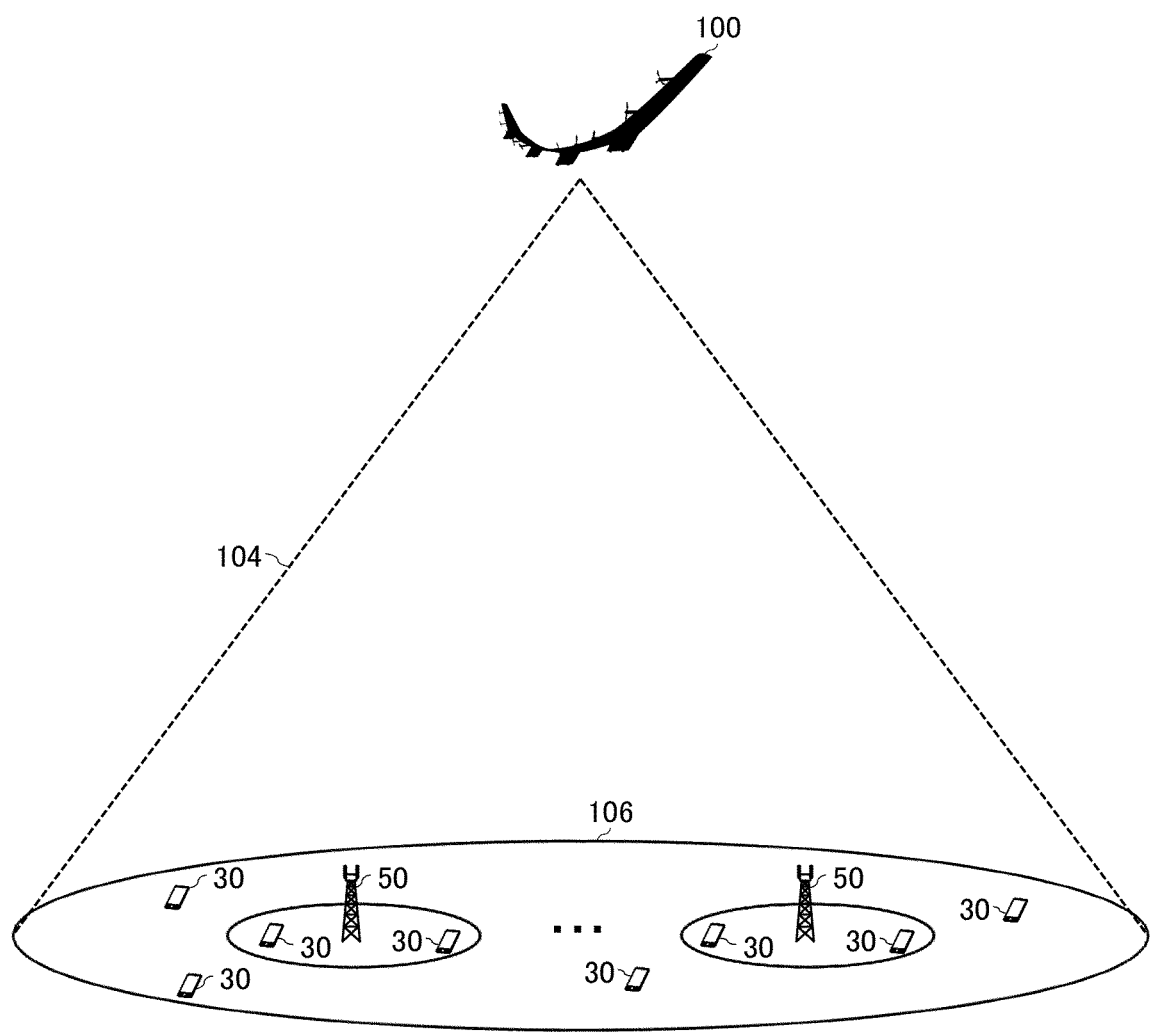
FIG. 2 schematically illustrates an example of a communication environment of the HAPS 100.

FIG. 2 schematically illustrates an example of a communication environment of the HAPS 100. The HAPS 100 can generate the cell 106 in an arbitrary area on the ground unless there is a special circumstance such as prohibition of generation of the cell 106.

For example, when the HAPS 100 generates the cell 106 in an area where a ground base station 50 is not installed, it is possible to newly provide a wireless communication service in the area. For example, by generating the cell 106 at a position adjacent to the cell of the ground base station 50, the HAPS 100 can expand an area in which a wireless communication service can be provided. For example, the HAPS 100 can complement the ground base station 50 by generating the cell 106 in an area including the ground base station 50, and a wireless communication service can be provided while the HAPS 100 and the ground base station 50 complement each other.

When the HAPS 100 generates the cell 106 in an area including the ground base station 50 or at a position adjacent to the cell of the ground base station 50, the cells of a large number of ground base stations 50 may be neighboring cells. The HAPS 100 can cover a large area having a diameter of, for example, 200 km, and there is a possibility that the number of ground base stations 50 to be neighboring cells becomes considerably large.

The cell information of a neighboring cell is registered in the NRT. The cell information includes a physical cell identifier (may be referred to as a Physical Cell Id (PCI)). The cell information may include the base station identification information of the wireless base station which is generating a cell. The base station identification information may be an eNB ID in the case of the LTE communication scheme, or may be a gNB ID in the case of the 5G communication scheme. The cell information may include an IP address of a control plane (C-Plane). The cell information may include a mobile country code (MCC). The cell information may include a mobile network code (MNC). The cell information may include a cell global identifier. The cell global identifier is, for example, an E-UTRAN cell global identification (ECGI). The cell information may include a downlink frequency and an uplink frequency. The cell information may include a bandwidth. The cell information may include a tracking area code (TAC). In the NRT, there is a registration upper limit of neighboring cells such as 256 and 512 due to restrictions on hardware resources such as a memory and software, and there is a possibility of depletion when the number of neighboring cells is large.

Figure 3:
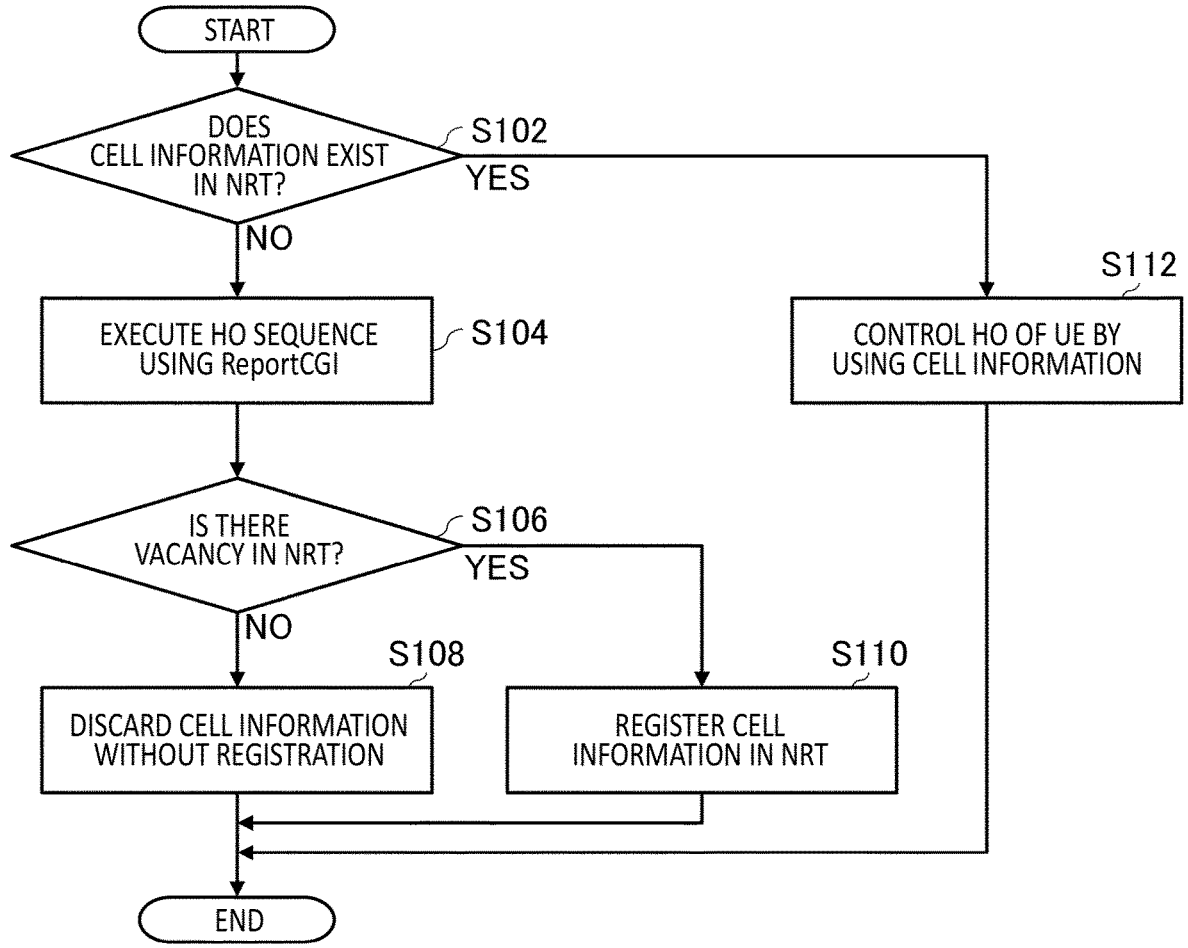
FIG. 3 schematically illustrates an example of a sequence of conventional HO using an NRT.
Figure 4:
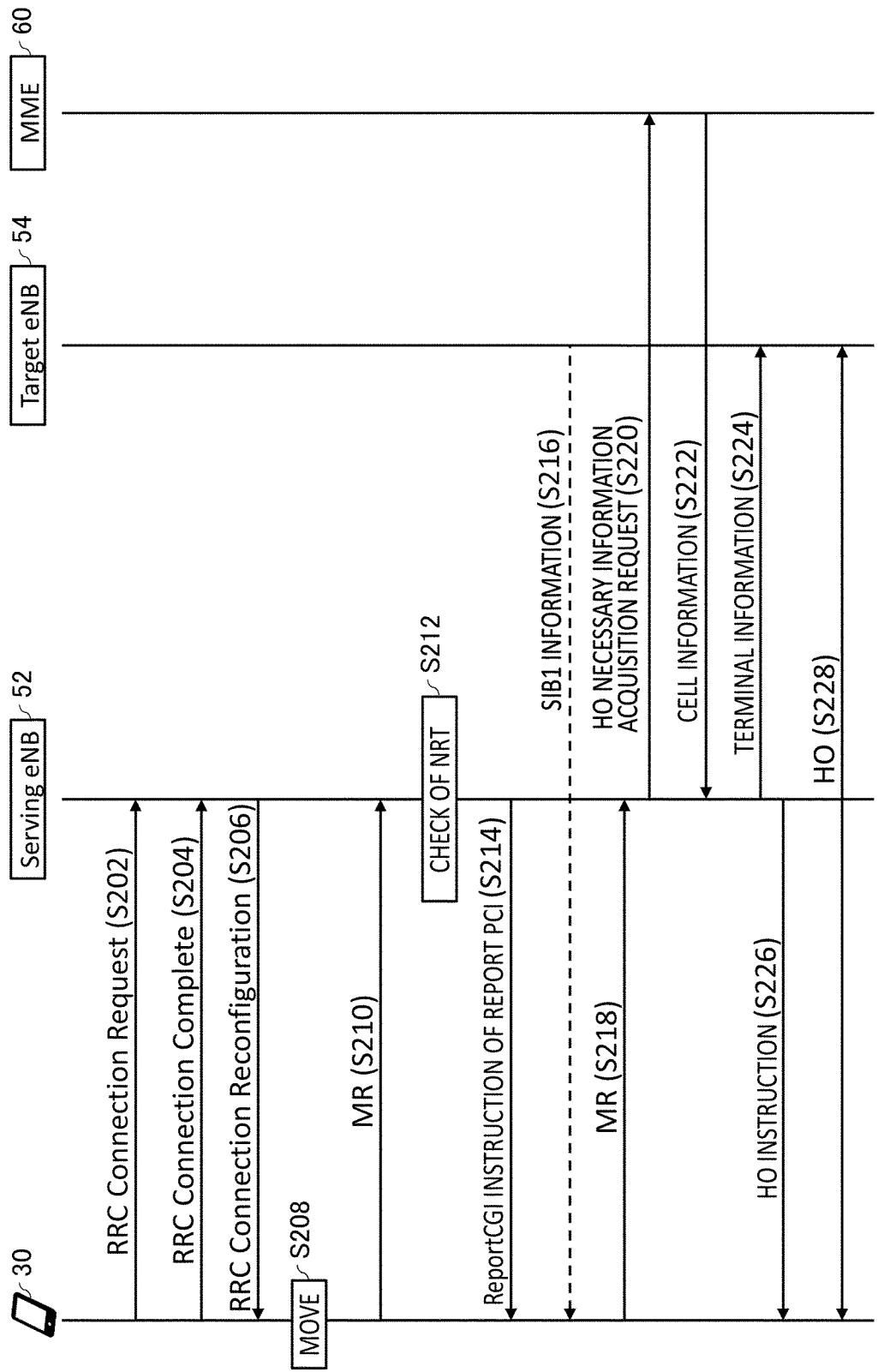
FIG. 4 schematically illustrates an example of a sequence of HO using ReportCGI.
Figure 5:
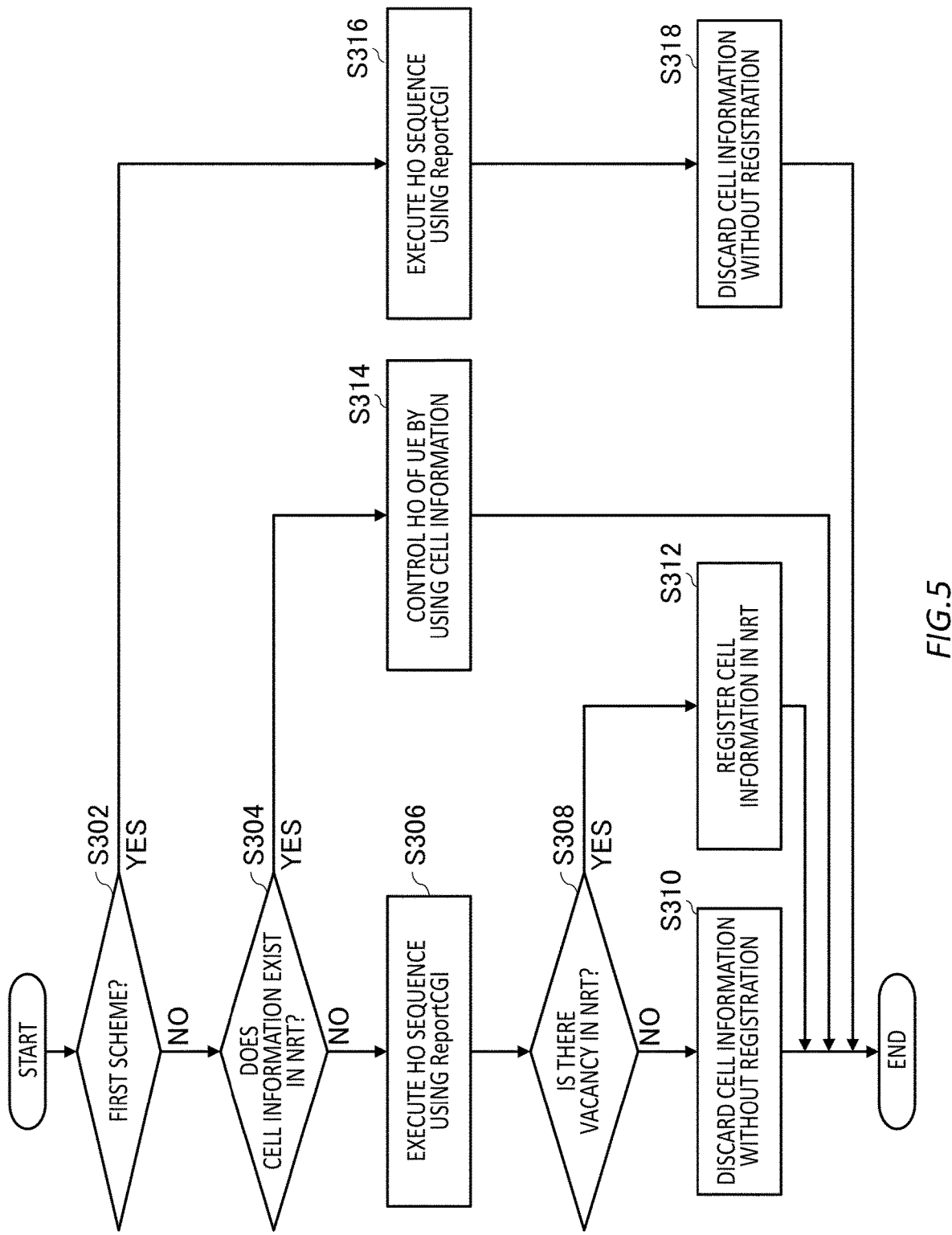
FIG. 5 schematically illustrates an example of a sequence of HO by a base station device 300.

The base station device 300 according to the present embodiment provides a service of HO not consuming the NRT when a specific condition is satisfied. With reference to FIGS. 3 to 5, a difference between the sequence of conventional HO and the sequence of HO by the base station device 300 will be described.

FIG. 3 schematically illustrates an example of the sequence of the conventional HO using the NRT. Here, a state in which the wireless base station receives a measurement report (may be referred to as an MR) for HO from the user terminal 30 will be described as a start state.

In step (step may be referred to as S) 102, the wireless base station checks the NRT and determines whether the cell information of an HO candidate wireless base station included in the measurement report exists in the NRT. When it is determined that the cell information does not exist, the process proceeds to S104, and when it is determined that the cell information exists, the process proceeds to S112.

In S104, the wireless base station executes the sequence of HO in a format (may be referred to as ReportCGI) in which the user terminal 30 is caused to measure neighboring cell information. The wireless base station may cause the user terminal 30 to measure the system information of a neighboring cell, and may receive, from the user terminal 30, the cell global identifier included in the system information. The wireless base station may receive the cell information of the HO candidate wireless base station from the core network 20 by using the cell global identifier. The wireless base station may control the HO of the user terminal 30 by using the received cell information.

In S106, the wireless base station determines whether there is a vacancy in the NRT. When it is determined that there is no vacancy, the process proceeds to S108, and when it is determined that there is a vacancy, the process proceeds to S110.

In S108, the wireless base station discards the cell information received from the core network 20 in S104 without registering the cell information in the NRT. In S110, the wireless base station registers, in the NRT, the cell information received from the core network 20 in S104.

In S112, the wireless base station controls the HO of the user terminal 30 by using the cell information of the HO candidate wireless base station included in the NRT.

FIG. 4 schematically illustrates an example of the sequence of the HO using ReportCGI. Here, a sequence of HO in the LTE communication scheme will be exemplified. A flow while the user terminal 30 is connected to a Serving eNB 52 and performs HO to a Target eNB 54 will be described. Note that in the case of the 5G communication scheme, a Serving gNB, a Target gNB, and an access and mobility management function (AMF) correspond to the Serving eNB 52, the Target eNB 54, and an MME 60, respectively.

In S202, the user terminal 30 transmits an RRC connection request to the Serving eNB 52. The Serving eNB 52 recognizes the terminal identification information of the user terminal 30. Connection processing is performed between the user terminal 30 and the Serving eNB 52.

In S204, the user terminal 30 transmits RRC Connection Complete to the Serving eNB 52. The Serving eNB 52 recognizes a connection Public Land Mobile Network (PLMN) of the user terminal 30.

In S206, the Serving eNB 52 transmits RRC Connection Reconfiguration to the user terminal 30. The RRC Connection Reconfiguration may include designation of an event of handover, a condition for transmitting the MR, and the like.

In S208, the user terminal 30 moves. Here, the description will be continued assuming that the condition for transmitting the MR is satisfied by the movement. The user terminal 30 measures an HO candidate frequency (E-UTRAN Absolute Radio Frequency Channel Number (EARFCN)).

In S210, the user terminal 30 transmits an MR to the Serving eNB 52. The MR includes the PCI of an HO candidate and reception quality. The reception quality may include reference signal received power (RSRP) and reference signal received quality (RSRQ). The Serving eNB 52 acquires the PCI of the HO candidate.

In S212, the Serving eNB 52 checks the NRT. The Serving eNB 52 checks whether the PCI of the HO candidate cell acquired in S210 is included in the NRT. Here, a case where the PCI is not included will be described, but when the PCI is included, the Serving eNB 52 may control the HO of the user terminal 30 by using the cell information of the HO candidate cell included in the NRT.

In S214, the Serving eNB 52 transmits the ReportCGI instruction of the PCI reported in S210 to the user terminal 30. In S216, the user terminal 30 performs measurement on SIB1 information according to the ReportCGI instruction received in S214. In this example, the user terminal 30 acquires the SIB1 information reported by the target eNB 54.

In S218, the user terminal 30 transmits an MR to the Serving eNB 52. The MR includes the ECGI included in the SIB1 information measured in S216.

In S220, the Serving eNB 52 transmits an HO necessary information acquisition request to the MME 60 by using the ECGI included in the MR received in S218. In S222, the MME 60 transmits cell information corresponding to the ECGI to the Serving eNB 52.

In S224, the Serving eNB 52 transmits the terminal information of the user terminal 30 to the Target eNB 54. In S226, the Serving eNB 52 transmits an HO instruction to the user terminal 30. In S228, HO is realized between the user terminal 30 and the target eNB 54.

FIG. 5 schematically illustrates an example of a sequence of HO by the base station device 300. Here, a difference from the sequence of the HO in FIG. 3 will be mainly described.

In the example illustrated in FIG. 5, in response to reception of the MR for HO from the user terminal 30, the base station device 300 selects the scheme of HO from a first scheme not using the NRT and a second scheme using the NRT. The base station device 300 determines, for example, whether the user terminal 30 is designated to a PLMN always using ReportCGI, selects the first scheme when designated, and selects the second scheme when not designated.

When the second scheme is selected, the process proceeds to S304, and when the first scheme is selected, the process proceeds to S316. S304 to S314 may be similar to S102 to S112.

In S316, the base station device 300 executes the HO sequence using ReportCGI. The base station device 300 may cause the user terminal 30 to measure the system information of a neighboring cell, and may receive, from the user terminal 30, the cell global identifier included in the system information. The base station device 300 may receive the cell information of the HO candidate wireless base station from the core network 20 by using the cell global identifier. The base station device 300 may control the HO of the user terminal 30 by using the received cell information.

In S318, the base station device 300 discards the cell information without registering the cell information in the NRT. Then, the processing ends. As described above, according to the base station device 300 according to the present embodiment, for example, the HO using ReportCGI is always performed on the user terminal 30 of a specific carrier, so that the wireless base station of the specific carrier can be prevented from being registered as a neighboring cell, and the depletion of the NRT can be suppressed.

Figure 6:
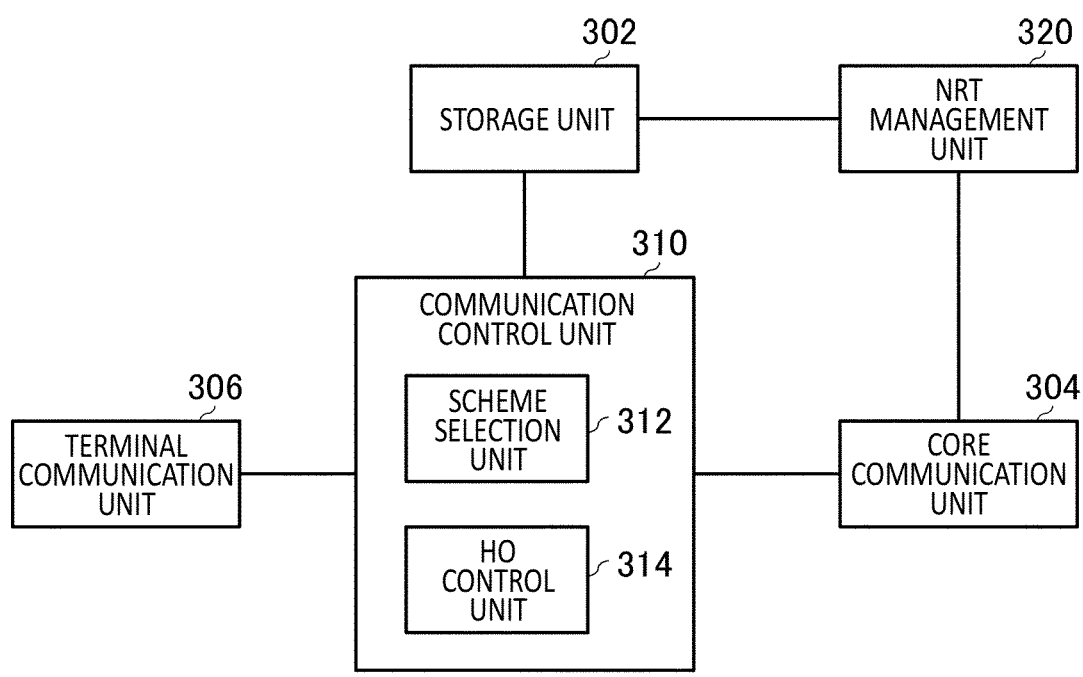
FIG. 6 schematically illustrates an example of a functional configuration of the base station device 300.

FIG. 6 schematically illustrates an example of a functional configuration of the base station device 300. The base station device 300 includes a storage unit 302, a core communication unit 304, a terminal communication unit 306, a communication control unit 310, and an NRT management unit 320. Note that it is not essential that the base station device 300 is provided with all of these.

The storage unit 302 stores various types of information. The storage unit 302 stores the NRT.

The core communication unit 304 communicates with the core network 20. The core communication unit 304 may establish the gateway 40 on the ground and the feeder link 102 by an FL antenna for communication with the gateway 40. The core communication unit 304 may communicate with the core network 20 on the ground via the feeder link 102.

The terminal communication unit 306 communicates with the user terminal 30. The terminal communication unit 306 may form the cell 106 by irradiating the ground with the beam 104 by using the SL antenna. The terminal communication unit 306 may establish a service link with the user terminal 30 in the cell 106.

The communication control unit 310 controls communication with the core network 20 and communication with the user terminal 30. The communication control unit 310 establishes a wireless communication connection with the user terminal 30 and relays communication between the user terminal 30 and the core network 20.

For example, the communication control unit 310 establishes a wireless communication connection with the user terminal 30 in response to reception of a connection request from the user terminal 30. The communication control unit 310 may manage the connection state with the user terminal 30 by RRC. The communication control unit 310 acquires the terminal identification information and the connected business operator of the user terminal 30 that has established the wireless communication connection.

The communication control unit 310 transmits information regarding the HO to the user terminal 30. The communication control unit 310 notifies the user terminal 30 of the designation of the handover event, the condition for transmitting the MR, and the like by RRC Connection Reconfiguration, for example. The communication control unit 310 acquires the PCI of the HO candidate by the MR received from the user terminal 30 by the terminal communication unit 306.

The communication control unit 310 controls the HO of the user terminal 30. The communication control unit 310 may include a scheme selection unit 312 and an HO control unit 314.

When receiving the MR for HO from the user terminal 30, the scheme selection unit 312 selects the scheme of the HO from the first scheme not using the NRT and the second scheme using the NRT. The first scheme may be a scheme of 100% using ReportCGI and not performing registration in the NRT. The second scheme may be a scheme of basically executing the HO using the NRT and, when the PCI of the HO candidate is not registered in the NRT, performing registration in NRT by using ReportCGI.

The HO control unit 314 controls the HO of the user terminal 30. When the first scheme is selected by the scheme selection unit 312, the HO control unit 314 causes the user terminal 30 to measure the system information of the HO candidate cell and receives the cell global identifier included in the system information from the user terminal 30. Next, the HO control unit 314 receives the cell information of the cell corresponding to the cell global identifier from the core network 20 by using the received cell global identifier. Then, the HO control unit 314 controls the HO of the user terminal 30 by using the received cell information. When the first scheme is selected by the scheme selection unit 312, the HO control unit 314 discards the cell information received from the core network 20 without registering the cell information in the NRT.

When the second scheme is selected by the scheme selection unit 312, the HO control unit 314 determines whether the PCI of the HO candidate cell is included in the NRT. When included, the HO control unit 314 controls the HO of the user terminal 30 by using the cell information corresponding to the PCI. When not included, the HO control unit 314 causes the user terminal 30 to measure the system information of the HO candidate cell, and receives the cell global identifier included in the system information from the user terminal 30. Next, the HO control unit 314 receives the cell information of the HO candidate cell from the core network 20 by using the cell global identifier. Then, the HO control unit 314 controls the HO of the user terminal 30 by using the received cell information. The HO control unit 314 checks whether there is a vacancy in the NRT, and registers the cell information in the NRT when there is a vacancy. When there is no vacancy in the NRT, the HO control unit 314 discards the cell information.

For example, the scheme selection unit 312 selects the first scheme when the connected business operator of the user terminal 30 is a pre-registered business operator, and selects the second scheme when the connected business operator of the user terminal 30 is not a pre-registered business operator. The pre-registered business operator is registered as a business operator that performs HO 100% using ReportCGI and does not register cell information in an NRT. The registration is performed, for example, by a service provider who provides a wireless communication service to the user terminal 30 by the base station device 300. One business operator may be registered, or a plurality of business operators may be registered. For the registered business operator, since the NRT is not used, and the neighboring cell information is measured every time, there is a possibility that the quality of the HO is degraded due to the delay of the HO timing, but this can reduce a possibility that the NRT is depleted and contribute to improvement of the overall quality of service. Note that as compared with the business operator using the first scheme, for the business operator using the second scheme, there is a possibility that a high-quality HO can be provided by using the NRT, and thus, some kind of loyalty condition may be added.

For example, when the coverage target of the HAPS 100 is a so-called rural area where there are almost no wireless base stations on the ground, the communication control unit 310 may turn off a selection function performed by the scheme selection unit 312 and always execute the HO using the second scheme. As a result, in a situation where there is a low possibility that the NRT is depleted, it is possible to prevent the quality of HO from being degraded.

The scheme selection unit 312 may select the first scheme when the frequency of the HO candidate cell is a predetermined frequency and select the second scheme when the frequency of the HO candidate cell is not the predetermined frequency. The pre-registered frequency is registered as a frequency at which HO 100% using ReportCGI is performed and cell information is not registered in an NRT. The registration is performed, for example, by a service provider who provides a wireless communication service to the user terminal 30 by the base station device 300. One frequency may be registered, or a plurality of frequencies may be registered. For the cell of the registered frequency, since the NRT is not used, and the neighboring cell information is measured every time, there is a possibility that the quality of the HO is degraded due to the delay of the HO timing, but this can reduce a possibility that the NRT is depleted and contribute to improvement of the overall quality of service.

The scheme selection unit 312 may select the first scheme when the connected business operator of the user terminal 30 is a pre-registered business operator and the frequency of the HO candidate cell is the predetermined frequency, and may select the second scheme when the connected business operator of the user terminal 30 is not a pre-registered business operator and when the connected business operator of the user terminal 30 is a pre-registered business operator but the frequency of the HO candidate cell is not the predetermined frequency. As a result, a cell for which the first scheme is selected can be limited to a cell of a specific frequency of a specific business operator, and finer adjustment can be performed.

The scheme selection unit 312 may select the scheme of the HO from the first scheme and the second scheme according to the number of registrations of the NRT. For example, the scheme selection unit 312 selects the first scheme when the number of registrations of the NRT is larger than a predetermined first threshold, and selects the second scheme when the number of registrations is smaller than the first threshold. As a result, high-quality HO using the NRT is provided while the number of registrations of the NRT is small, and when the number of registrations of the NRT increases or approaches an upper limit, the depletion of the NRT can be prevented by stopping the registration in the NRT in advance.

The scheme selection unit 312 may select the first scheme when the number of registrations of the NRT is larger than the first threshold and the connected business operator of the user terminal 30 is a pre-registered business operator, and may select the second scheme when the number of registrations is smaller than the first threshold and when the number of registrations is larger than the first threshold but the connected business operator of the user terminal 30 is not a pre-registered business operator. As a result, high-quality HO using NRT is provided while the number of registrations of NRT is small, and when the number of registrations of NRT is increasing, the possibility of the depletion of the NRT can be reduced by not registering some business operators in the NRT.

In a case where the number of registrations of the NRT is larger than the first threshold and smaller than a second threshold larger than the first threshold, the scheme selection unit 312 may select the first scheme when the connected business operator of the user terminal 30 is the pre-registered first business operator, and may select the second scheme when the connected business operator of the user terminal 30 is not the first business operator. In addition, in a case where the number of registrations of the NRT is larger than the second threshold, the scheme selection unit 312 may select the first scheme when the connected business operator of the user terminal 30 is either the first business operator or the second business operator and may select the second scheme when the connected business operator of the user terminal 30 is neither the first business operator nor the second business operator. As a result, as the number of registrations of the NRT increases, the number of target business operators adopting the first scheme can be increased in stages, and the provision of high-quality HO and the prevention of NRT depletion can be realized in a well-balanced manner.

In a case where the number of registrations of the NRT is larger than the first threshold and smaller than the second threshold larger than the first threshold, the scheme selection unit 312 may select the first scheme when the frequency of the HO candidate cell is the predetermined frequency and may select the second scheme when the frequency of the HO candidate cell is not the predetermined frequency. In addition, in a case where the number of registrations of the NRT is larger than the second threshold, the scheme selection unit 312 may select the first scheme when the connected business operator of the user terminal 30 is a pre-registered business operator, and may select the second scheme when the connected business operator of the user terminal 30 is not a pre-registered business operator. As a result, a control can be realized such that as the number of registrations of the NRT increases, the first scheme is first adopted for cells of some frequencies of a business operator and then the first scheme is adopted for all cells of the business operator, and the provision of high-quality HO and the prevention of NRT depletion can be realized in a well-balanced manner.

The NRT management unit 320 manages the NRT stored in the storage unit 302. The NRT management unit 320 may execute an automatic neighbor relation (ANR) function. The NRT management unit 320 communicates with another wireless base station such as the ground base station 50 according to an X2 protocol to update the NRT when a neighbor relation changes or the cell information of a neighboring cell changes. The scheme selection unit 312 may select the scheme of the HO according to the number of registrations of the NRT changed by the execution of the ANR by the NRT management unit 320.

In the above embodiment, a case where the base station device 300 is mounted on the HAPS 100 has been mainly described as an example, but the present invention is not limited thereto. The base station device 300 may be a wireless base station arranged on the ground. In this case, the core communication unit 304 may communicate with the core network 20 via a wired network on the ground. In addition, the terminal communication unit 306 may establish a wireless communication connection with the user terminal 30 in the cell 106 and communicate with the user terminal 30.

Figure 7:
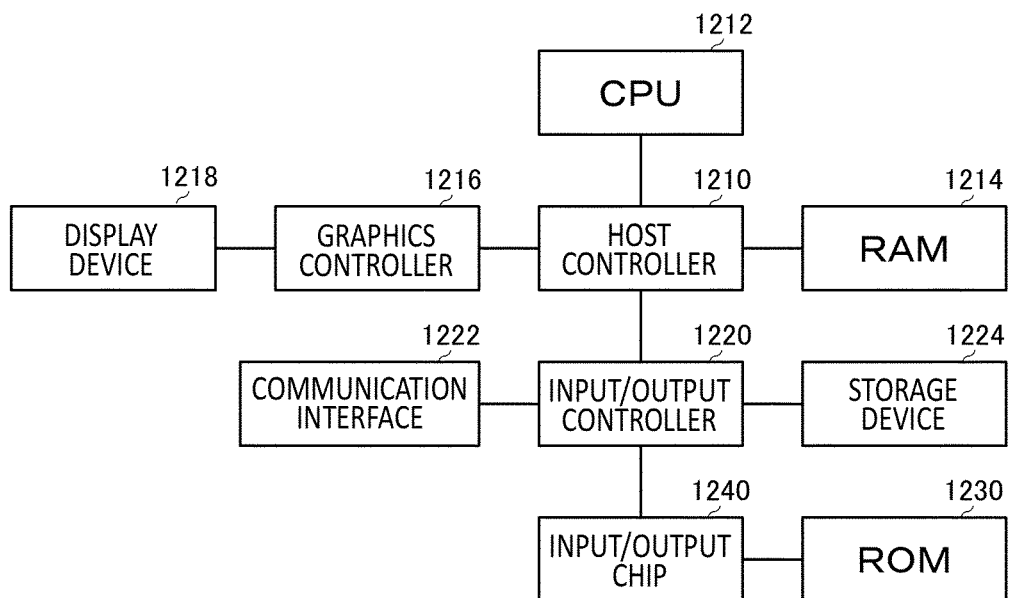
FIG. 7 schematically illustrates an example of a hardware configuration of a computer 1200 that functions as the base station device 300.

FIG. 7 schematically illustrates an example of a hardware configuration of a computer 1200 that functions as the base station device 300. Programs installed in the computer 1200 can cause the computer 1200 to function as one or more "units" of the device according to the present embodiment or can cause the computer 1200 to execute operations associated with the devices according to the present embodiment or the one or more "units", and/or can cause the computer 1200 to execute a process according to the present embodiment or steps of the process. Such a program may be executed by a CPU 1212 to cause the computer 1200 to perform specific operations associated with some or all of the blocks in the flowcharts and block diagrams described in the specification.

The computer 1200 according to the present embodiment includes a CPU 1212, a RAM 1214, and a graphics controller 1216, which are connected to each other via a host controller 1210. In addition, the computer 1200 includes input/output units such as a communication interface 1222, a storage device 1224, and a DVD driver and an IC card drive, which are connected to the host controller 1210 through an input/output controller 1220. The storage device 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates according to the programs stored in the ROM 1230 and the RAM 1214, thereby controlling each unit. The graphics controller 1216 obtains image data which is generated, by the CPU 1212, in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The IC card drive reads the program and data from an IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port or the like to the input/output controller 1220.

A program is provided by a computer-readable storage medium such as the DVD-ROM or the IC card. The program is read from the computer-readable storage medium, installed into the storage device 1224, RAM 1214, or ROM 1230, which are also examples of a computer-readable storage medium, and executed by the CPU 1212. Information processing written in these programs is read by the computer 1200, and provides cooperation between the programs and the various types of hardware resources described above. A device or method may be constituted by realizing the operation or processing of information in accordance with the usage of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. Then, the CPU 1212 may write the processed data back in the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying a predetermined condition.

The programs or software module described above may be stored on the computer 1200 or in a computer-readable storage medium near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flowcharts and block diagrams in the present embodiments may represent steps of processes in which operations are performed or "units" of devices responsible for performing operations. A specific step and "unit" may be implemented by dedicated circuitry, programmable circuitry supplied along with a computer-readable instruction stored on a computer-readable storage medium, and/or a processor supplied along with the computer-readable instruction stored on the computer-readable storage medium. The dedicated circuit may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer-readable storage medium may include any tangible device capable of storing an instruction performed by an appropriate device, so that the computer-readable storage medium having the instruction stored thereon constitutes a product including an instruction that may be performed in order to provide means for performing an operation specified by a flowchart or a block diagram. An example of the computer-readable storage medium may include an electronic storage medium, a magnetic storage medium, an optical storage medium, an electromagnetic storage medium, or a semiconductor storage medium. More specific examples of computer readable storage media may include a floppy disc (registered trademark), a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

The computer-readable instruction may be provided to a general purpose computer, a special purpose computer, or a processor or programmable circuitry of another programmable data processing device locally or via a local area network (LAN), a wide area network (WAN) such as the Internet or the like in order that the general purpose computer, the special purpose computer, or the processor or the programmable circuitry of the other programmable data processing device performs the computer-readable instruction to provide means for performing operations specified by the flowchart or the block diagram. Examples of the processor include a computer processor, a processing unit, a microprocessor, a digital signal processor, a controller, a microcontroller, and the like.

In the above embodiment, the HAPS 100 has been described as an example of a flight vehicle having an antenna for forming a wireless communication area by irradiating the ground with a beam and providing a wireless communication service to a user terminal in the wireless communication area, but the present invention is not limited thereto. Examples of the flight vehicle include an unmanned aerial vehicle such as a balloon, an airship, an airplane, and a drone capable of forming a wireless communication area.

While the present invention has been described with the embodiments, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20: network;
30: user terminal;
40: gateway;
50: ground base station;
52: Serving eNB;
54: Target eNB;
60: MME;
100: HAPS;
102: feeder link;
104: beam;
106: cell;
110: main body portion;
120: wing portion;
130: solar cell panel;
200: flight control device;
300: base station device;
302: storage unit;
304: core communication unit;

306: terminal communication unit;
310: communication control unit;
312: scheme selection unit;
314: HO control unit;
320: NRT management unit;
1200: computer;
1210: host controller;
1212: CPU;
1214: RAM;
1216: graphic controller;
1218: display device;
1220: input/output controller;
1222: communication interface;
1224: storage device;
1230: ROM; and
1240: input/output chip.

What is claimed is:

1. A base station device comprising:
a storage unit that stores a neighbor relation table;
a scheme selection unit that selects a scheme of HO from a first scheme not using the neighbor relation table and a second scheme using the neighbor relation table when receiving a measurement report for HO from a user terminal; and
an HO control unit that, when the first scheme is selected, causes the user terminal to measure system information of an HO candidate cell, receives, from the user terminal, a cell global identifier included in the system information, and controls HO of the user terminal by using cell information of the HO candidate cell received from a core network by using the cell global identifier, and
when the second scheme is selected, determines whether a physical cell identifier of the HO candidate cell is included in the neighbor relation table, when the physical cell identifier is included, controls the HO of the user terminal by using cell information corresponding to the physical cell identifier, and when the physical cell identifier is not included, causes the user terminal to measure the system information of the HO candidate cell, receives, from the user terminal, the cell global identifier included in the system information, controls the HO of the user terminal by using the cell information of the HO candidate cell received from the core network by using the cell global identifier, and registers the cell information in the neighbor relation table.

2. The base station device according to claim 1, wherein when the first scheme is selected, the HO control unit discards the cell information received from the core network without registering the cell information in the neighbor relation table.

3. The base station device according to claim 1, wherein the scheme selection unit selects the first scheme when a connected business operator of the user terminal is a pre-registered business operator, and selects the second scheme when the connected business operator of the user terminal is not the pre-registered business operator.

4. The base station device according to claim 2, wherein the scheme selection unit selects the first scheme when a connected business operator of the user terminal is a pre-registered business operator, and selects the second scheme when the connected business operator of the user terminal is not the pre-registered business operator.

5. The base station device according to claim 1, wherein the scheme selection unit selects the first scheme when a connected business operator of the user terminal is a pre-registered business operator and a frequency of the HO candidate cell is a predetermined frequency, and selects the second scheme when the connected business operator of the user terminal is not the pre-registered business operator and when the connected business operator of the user terminal is the pre-registered business operator but the frequency of the HO candidate cell is not the predetermined frequency.

6. The base station device according to claim 2, wherein the scheme selection unit selects the first scheme when a connected business operator of the user terminal is a pre-registered business operator and a frequency of the HO candidate cell is a predetermined frequency, and selects the second scheme when the connected business operator of the user terminal is not the pre-registered business operator and when the connected business operator of the user terminal is the pre-registered business operator but the frequency of the HO candidate cell is not the predetermined frequency.

7. The base station device according to claim 1, wherein the scheme selection unit selects the first scheme when a frequency of the HO candidate cell is a predetermined frequency, and selects the second scheme when the frequency of the HO candidate cell is not the predetermined frequency.

8. The base station device according to claim 2, wherein the scheme selection unit selects the first scheme when a frequency of the HO candidate cell is a predetermined frequency, and selects the second scheme when the frequency of the HO candidate cell is not the predetermined frequency.

9. The base station device according to claim 1, wherein the scheme selection unit selects the HO scheme from the first scheme and the second scheme according to a number of registrations of the neighbor relation table.

10. The base station device according to claim 9, wherein the scheme selection unit selects the first scheme when a number of registrations of the neighbor relation table is larger than a predetermined first threshold, and selects the second scheme when the number of registrations is smaller than the first threshold.

11. The base station device according to claim 10, wherein the scheme selection unit selects the first scheme when the number of registrations of the neighbor relation table is larger than the first threshold and a connected business operator of the user terminal is a pre-registered business operator, and selects the second scheme when the number of registrations is smaller than the first threshold and when the number of registrations is larger than the first threshold and the connected business operator of the user terminal is not the pre-registered business operator.

12. The base station device according to claim 10, wherein
the scheme selection unit
in a case where the number of registrations of the neighbor relation table is larger than the first threshold and smaller than a second threshold larger than the first threshold, selects the first scheme when a connected business operator of the user terminal is a pre-registered first business operator, and selects the second scheme when the connected business operator of the user terminal is not the first business operator, and
in a case where when the number of registrations of the neighbor relation table is larger than the second threshold, selects the first scheme when the connected business operator of the user terminal is either the first business operator or the second business operator, and selects the second scheme when the connected business operator of the user terminal is neither the first business operator nor the second business operator.

13. The base station device according to claim 10, wherein
the scheme selection unit
in a case where the number of registrations of the neighbor relation table is larger than the first threshold and smaller than a second threshold larger than the first threshold, selects the first scheme when a frequency of the HO candidate cell is a predetermined frequency, and selects the second scheme when the frequency of the HO candidate cell is not the predetermined frequency, and
in a case where the number of registrations of the neighbor relation table is larger than the second threshold, selects the first scheme when a connected business operator of the user terminal is a pre-registered business operator, and selects the second scheme when the connected business operator of the user terminal is not the pre-registered business operator.

14. A flight vehicle comprising the base station device according to claim 1, wherein
the base station device forms a cell on a ground and provides a wireless communication service to the user terminal in the cell.

15. A flight vehicle comprising the base station device according to claim 2, wherein
the base station device forms a cell on a ground and provides a wireless communication service to the user terminal in the cell.

16. A flight vehicle comprising the base station device according to claim 3, wherein
the base station device forms a cell on a ground and provides a wireless communication service to the user terminal in the cell.

17. A flight vehicle comprising the base station device according to claim 4, wherein
the base station device forms a cell on a ground and provides a wireless communication service to the user terminal in the cell.

18. The flight vehicle according to claim 14, wherein the flight vehicle functions as a stratosphere platform.

19. A non-transitory computer readable medium that stores a program which causes a computer to function as:
a storage unit that stores a neighbor relation table;
a scheme selection unit that selects a scheme of HO from a first scheme not using the neighbor relation table and a second scheme using the neighbor relation table when receiving a measurement report for HO from a user terminal; and
an HO control unit that, when the first scheme is selected, causes the user terminal to measure system information of an HO candidate cell, receives, from the user terminal, a cell global identifier included in the system information, and controls HO of the user terminal by using cell information of the HO candidate cell received from a core network by using the cell global identifier, and
when the second scheme is selected, determines whether a physical cell identifier of the HO candidate cell is included in the neighbor relation table, when the physical cell identifier is included, controls the HO of the user terminal by using cell information corresponding to the physical cell identifier, and when the physical cell identifier is not included, causes the user terminal to measure the system information of the HO candidate cell, receives, from the user terminal, the cell global identifier included in the system information, controls the HO of the user terminal by using the cell information of the HO candidate cell received from the core network by using the cell global identifier, and registers the cell information in the neighbor relation table.

20. A control method executed by a base station device, comprising:
selecting a scheme of HO from a first scheme not using a neighbor relation table stored in a storage unit of the base station device and a second scheme using the neighbor relation table when receiving a measurement report for HO from a user terminal; and
controlling the HO by, when the first scheme is selected in the selecting the scheme, causing the user terminal to measure system information of an HO candidate cell, receiving, from the user terminal, a cell global identifier included in the system information, and controlling HO of the user terminal by using cell information of the HO candidate cell received from a core network by using the cell global identifier, and
when the second scheme is selected in the selecting the scheme, determining whether a physical cell identifier of the HO candidate cell is included in the neighbor relation table, when the physical cell identifier is included, controlling the HO of the user terminal by using cell information corresponding to the physical cell identifier, and when the physical cell identifier is not included, causing the user terminal to measure the system information of the HO candidate cell, receiving, from the user terminal, the cell global identifier included in the system information, controlling the HO of the user terminal by using the cell information of the HO candidate cell received from the core network by using the cell global identifier, and registering the cell information in the neighbor relation table.

* * * * *